US011372628B2

(12) United States Patent
Rubinger (10) Patent No.: US 11,372,628 B2
(45) Date of Patent: Jun. 28, 2022

(54) APPLICATION DEVELOPMENT INTERFACE

(71) Applicant: Red Hat, Inc., Raleigh, NC (US)

(72) Inventor: Andrew L. Rubinger, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 16/280,838

(22) Filed: Feb. 20, 2019

(65) Prior Publication Data

US 2020/0264850 A1    Aug. 20, 2020

(51) Int. Cl.
  *G06F 8/70*    (2018.01)
  *G06F 8/38*    (2018.01)

(52) U.S. Cl.
  CPC . *G06F 8/38* (2013.01); *G06F 8/70* (2013.01)

(58) Field of Classification Search
  CPC .................................. G06F 8/38; G06F 8/70
  See application file for complete search history.

(56) References Cited

U.S. PATENT DOCUMENTS

| | | | |
|---|---|---|---|
| 9,851,953 B2 | 12/2017 | Straub et al. | |
| 9,996,331 B1 | 6/2018 | Chen | |
| 10,007,515 B2 | 6/2018 | Subramanian et al. | |
| 10,042,618 B1 | 8/2018 | Hulbert et al. | |
| 10,048,957 B2 | 8/2018 | Li et al. | |
| 2006/0235760 A1* | 10/2006 | Sanjar | G06Q 30/0601 705/26.1 |
| 2012/0291006 A1* | 11/2012 | Quine | G06F 8/00 717/105 |
| 2013/0297973 A1* | 11/2013 | Hyland | G06F 11/28 714/27 |
| 2014/0282398 A1* | 9/2014 | Podolyak | G06F 8/36 717/121 |
| 2015/0039999 A1* | 2/2015 | Chasman | H04L 67/10 715/234 |
| 2016/0098256 A1* | 4/2016 | Tehrani | G06F 8/10 717/107 |
| 2018/0191865 A1 | 7/2018 | De Gaetano et al. | |
| 2019/0087161 A1* | 3/2019 | Sathe | G06F 9/546 |
| 2019/0213061 A1* | 7/2019 | Campos-Guajardo | G06F 9/541 |
| 2020/0097268 A1* | 3/2020 | Olsson | G06F 8/38 |

FOREIGN PATENT DOCUMENTS

CN    105278991 B    8/2018

OTHER PUBLICATIONS

Dracle Cloud: Oracle Cloud Platform For Application Development, 2015, 6 pages.

* cited by examiner

*Primary Examiner* — Jennifer N Welch
*Assistant Examiner* — KC Chen
(74) *Attorney, Agent, or Firm* — Womble Bond Dickinson (US) LLP (57) ABSTRACT

The display of a user interface including components associated with an application may be caused. A first selection of a component from the plurality of components associated with the application may be received via the user interface. In response to receiving the first selection of the component, properties associated with the component may be identified. A second selection of one or more properties associated with the component may be received via the user interface. In response to receiving the second selection of the one or more properties, the application may be generated in view of the component and the one or more properties associated with the component.

20 Claims, 9 Drawing Sheets

APPLICATION DEVELOPMENT INTERFACE

TECHNICAL FIELD

Aspects of the present disclosure relate to an application development interface.

BACKGROUND

Application development is the process of creating and maintaining applications. Application development is a process of writing and maintaining source code to enable an application to perform one or more tasks. The application may include processes running on one or more service layers of a computing system. The application may further include one or more components that communicate with one another via interfaces of the components. Upon development of the application, the application is deployed and made available for use.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Aspects of the present disclosure are directed towards an application development interface. Application development may be a complex task for a user. In particular, cloud-based application development is an inherently complex task. Currently, an application developer using a cloud-based application development system has to have an understanding of multiple application and service layers of a computing system. The application developer also has to understand how the multiple application and service layers interact with one another for the purposes of developing and deploying a cloud-based application. During the application development process, an application developer may program individual components of an application. Each of the components may communicate with one another via interfaces. The application developer may then generate configurations to link the interfaces of the individual components together for use by the application. For example, an application developer may program a database as an individual component and a messaging service as an individual component. The application developer may then create a configuration to link the interface of the database to the interface of the messaging service.

However, the complexity of cloud-based application development limits the number of application developers that are capable of developing applications on a cloud-based platform. Furthermore, the programming of the individual components of an application and generating configurations to tie the components together is time consuming, inefficient, and introduces the potential for errors in the programming code of the application, decreasing the performance of an application development system.

Aspects of the present disclosure address the above-noted and other deficiencies by using a processing logic of an application server to generate an application development interface. The application development interface may be a user interface that is provided to a client device. The user interface may include one or more components that can be selected by the client device for use in an application. For example, a user of the client device wanting to develop a messaging application may select a messaging service as a component. The client device may transmit the selected components to the application server via a network.

Upon receiving the selected application components, the processing logic may identify dependent components utilized by the selected components. For example, upon receiving a selection of a messaging service as a component, the processing logic may identify a database as a dependent component. The processing logic may then identify one or more databases available for use by the application and provide a listing of the one or more databases to the client device via the application development interface. The client device may select one or more of the databases via the application development interface and transmit the selected database to the application server.

Upon receiving the dependent component, the processing logic may configure the dependent component for use the by the previously selected component. For example, upon receiving the selected database, the processing logic may configure the database so that the database may be utilized by the messaging service. The processing logic may also determine whether any supporting components may improve the performance of the application in view of the selected components. For example, upon receiving a selection of a messaging service and database, the processing logic may determine that adding a cache may improve the performance of the application. Once the components have been selected, the processing logic may generate the application by generating the programming code and configuring the components to link the interfaces of the components to communicate with one another. The processing logic may then deploy the generated application on the cloud-based platform for distribution.

Accordingly, by generating an application development interface that streamlines the cloud-based application development process, the efficiency and ease of developing applications using a cloud-based platform is greatly improved. By no longer requiring an application developer to manually program the code for the application, the resulting applications may be more reliable, improving the performance of the computing system.

Figure 1:
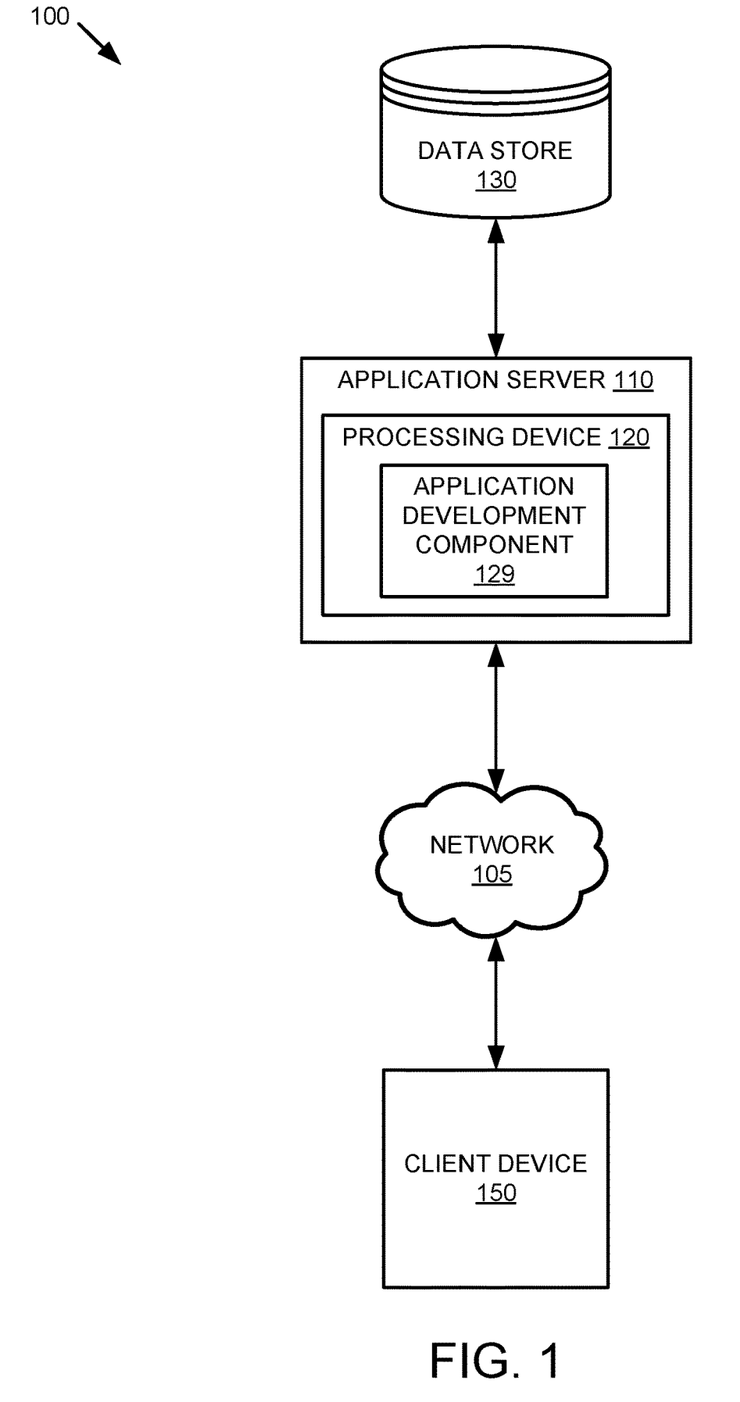
FIG. 1 is a block diagram that illustrates an example application development system, in accordance with some embodiments of the present disclosure.

FIG. 1 is a block diagram that illustrates an example application development system 100, in accordance with some embodiments of the present disclosure. The multi-level debugging system may include application server 110 and client device 150. In one embodiment, the application server 110 may host a cloud-based application development platform.

As illustrated in FIG. 1, application development system 100 includes application server 110 that includes a computing processing device 120 and a data store 130. The application server 110 and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of application server 110.

The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The application server 110 and client device 150 may include any suitable type of computing device or machine that has a programmable processor including, for example, server computers, desktop computers, laptop computers, tablet computers, smartphones, set-top boxes, etc. In some examples, application server 110 and client device 150 may comprise a single machine or may include multiple interconnected machines (e.g., multiple servers configured in a cluster). Application server 110 and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In embodiments, processing device 120 may execute an application development component 129. The application development component 129 may generate a user interface including one or more application components to be utilized by an application. The application development component 129 may provide the user interface to client device 150. The application development component 129 may further receive, from client device 150, one or more selected application and/or hardware components. The application development component 129 may also configure the selected application and/or hardware components. Further details regarding application development component 129 will be discussed at FIGS. 2-7 below.

Figure 2:
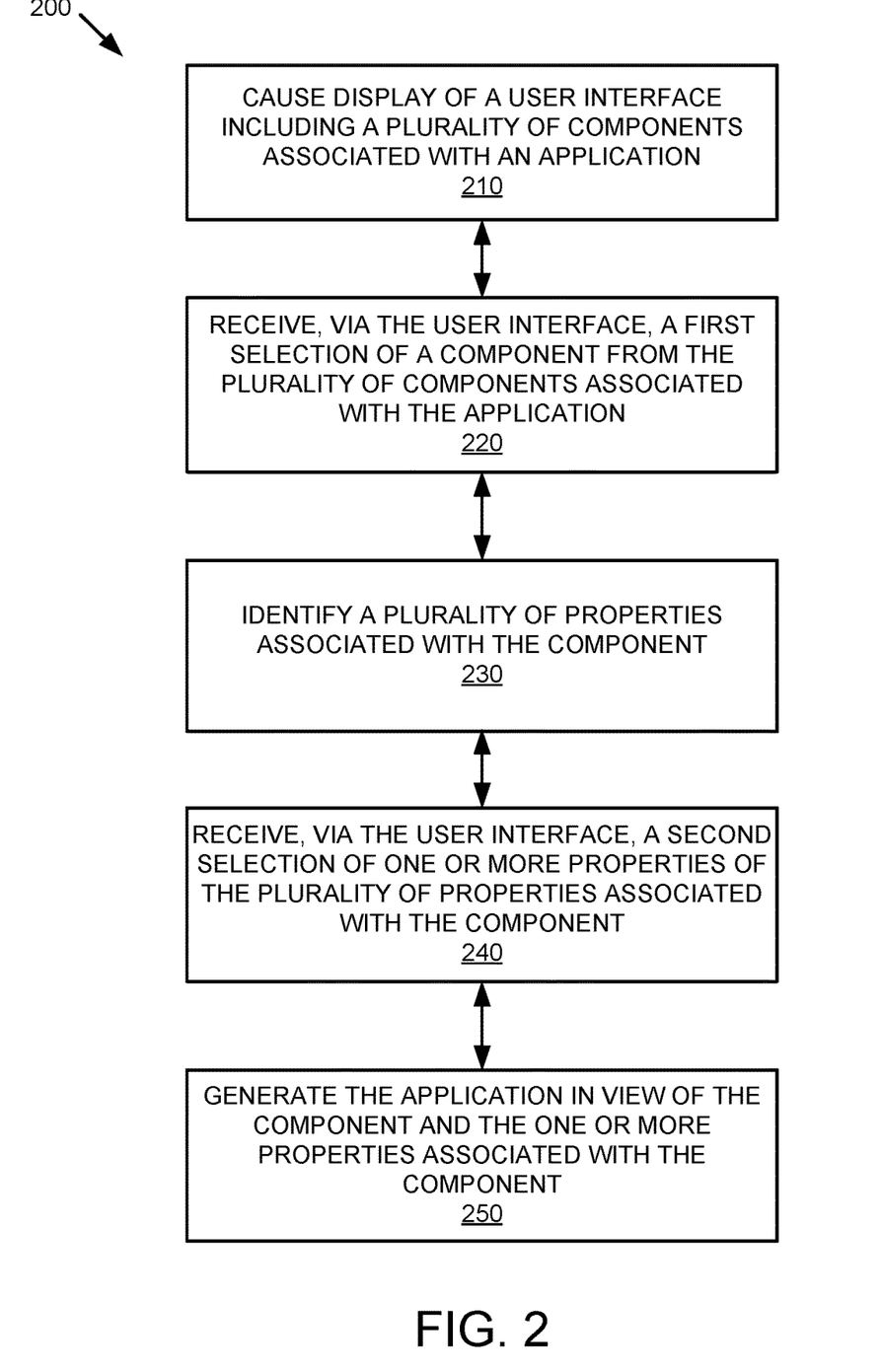
FIG. 2 is a flow diagram of a method of utilizing an application development interface to generate an application, in accordance with some embodiments of the present disclosure.

FIG. 2 is a flow diagram of a method 200 of utilizing an application development interface to generate an application, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 200 may be performed by application development component 129 of FIG. 1.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Referring to FIG. 2, at block 210 the processing logic of an application server causing display of a user interface including components (also referred to as "capabilities" hereafter) associated with an application. In embodiments, the processing logic may generate the user interface. In some embodiments, the user interface may be a graphical user interface (GUI). In embodiments, the application server may include a cloud-based platform. The components associated with the application may be application components and/or hardware components that may be utilized by an application. In embodiments, the hardware components may include virtualized components that may be utilized by an application. In embodiments, each of the components may include an interface to enable the communication of the components with one another. In an embodiment, the processing logic may cause the display of the user interface on a client device. For example, the processing logic may transmit the user interface to a client device for presentation on the client device.

At block 220, the processing logic receives a first selection of a component associated with the application via the user interface. In embodiments, the processing logic may receive the first selection of the component from the client device via a network. In some embodiments, upon receiving the selection of the component associated with the application, the processing logic may identify supporting components associated with the selected component. For example, upon receiving a selection of a messaging service and a database, the processing logic may identify a cache as a supporting component. The processing logic may then provide the supporting components via the user interface.

At block 230, the processing logic identifies properties associated with the component in response to receiving the first selection. The properties associated with the component may be utilized to configure the component when generating the application. For example, properties associated with the component may include a runtime to be utilized for the component, a type of component, a name for the component, etc.

At block 240, the processing logic receives a second selection of one or more of the properties associated with the component via the user interface. For example, the processing logic may receive a selection of a certain runtime and name to be utilized for the component.

At block 250, the processing logic of the application server generates the application in view of the component and one or more properties associated with the component. When generating the application, the processing logic may generate the programming code for the application in view of the selected one or more properties for the component. The processing logic may configure the selected components to link the interfaces of the selected components to one another. In embodiments, upon generating the application, the processing logic may deploy the application on a cloud-based platform for distribution.

Figure 3:
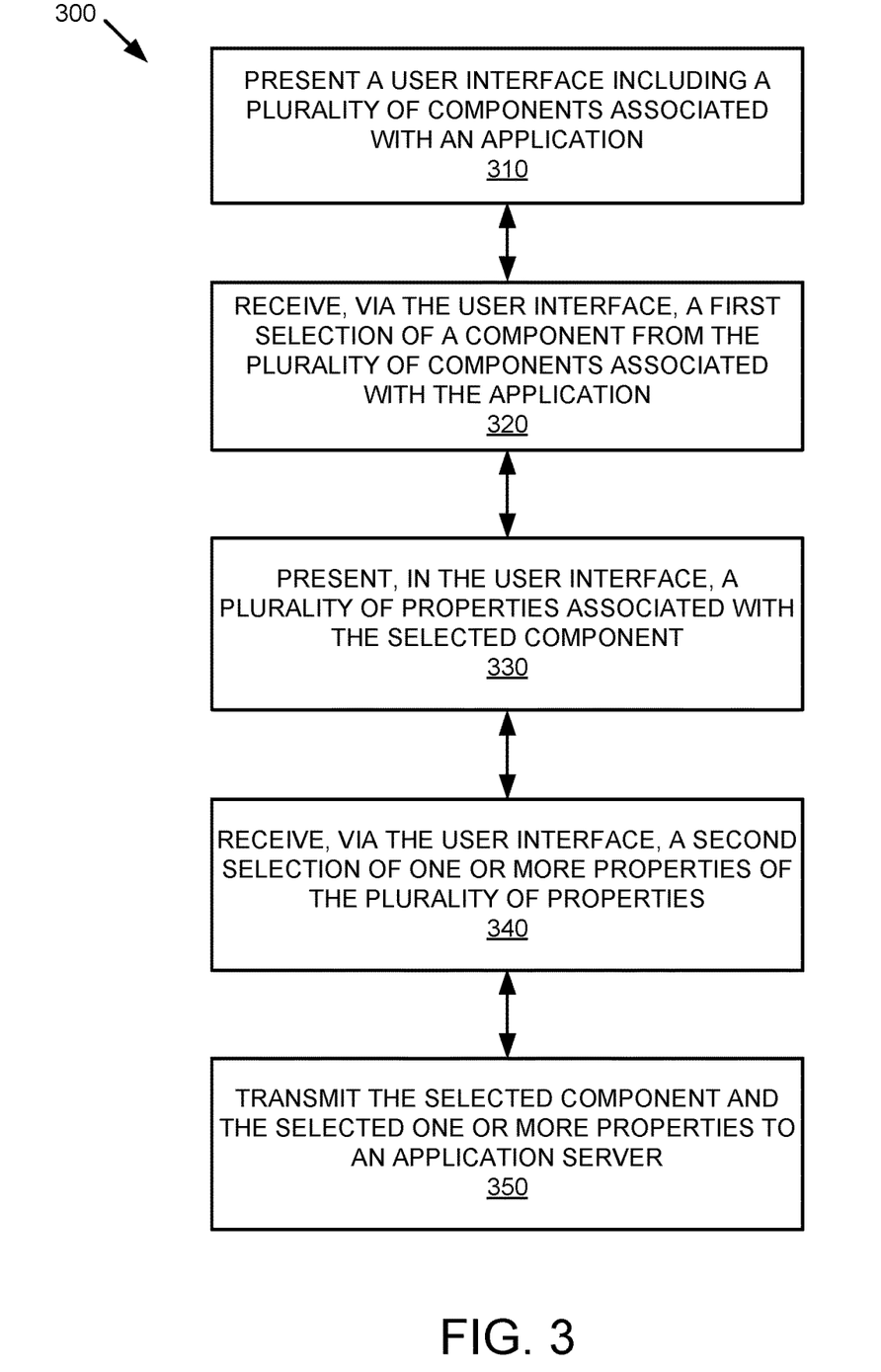
FIG. 3 is a flow diagram of a method of presenting an application development interface on a client device, in accordance with some embodiments of the present disclosure.

FIG. 3 is a flow diagram of a method 300 of presenting an application development interface on a client device, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by client device 150 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring to FIG. 3, at block 310 the processing logic presents a user interface that includes components associated with an application. In embodiments, the processing logic may receive the user interface from an application server.

At block 320, the processing logic receives a first selection of a component associated with the application via the user interface. In embodiments, a user of the client device may select the component associated with the application. For example, a user may select a messaging service via the user interface.

At block 330, the processing logic presents properties associated with the selected component in the user interface. For example, the processing logic may present a listing of runtimes available to be utilized by the selected component.

At block 340, the processing logic receives a second selection of one or more properties associated with the component. For example, the processing logic may receive a selection of a particular runtime from the listing of runtimes to be utilized by the selected component.

At block 350, the processing logic transmits the selected component and the selected one or more properties to an application server. In embodiments, transmitting the selected components to the application server may cause the application server to generate an application in view of the selected application components.

In some embodiments, transmitting the selected components to the application server may cause the application server to identify supporting components that may be added to the application in view of the selected component. For example, the processing logic may identify a cache that may be added to the application. In embodiments, the processing logic may receive a second user interface from the application server that includes the supporting components and present the second user interface. The processing logic may receive a selection associated with the supporting components via the second user interface. For example, the processing logic may receive a selection indicating whether or not the cache is to be added to the application. Upon receiving the selection, the processing logic may transmit the selection associated with the supporting component to the application server. For example, the processing logic may transmit the selection indicating whether or not the cache is to be added to the application to the application server.

Figure 4A:
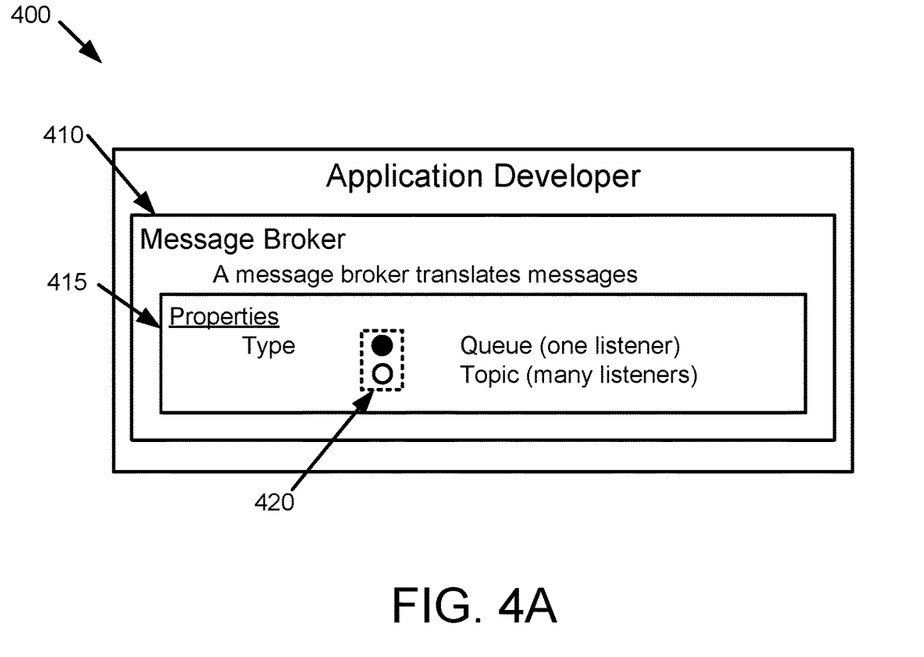
FIG. 4A is an illustration of an example of an application development interface including a first component of an application development system in accordance with aspects of the present disclosure.

FIG. 4A is an illustration of an example of an application development interface 400 including a first component of an application development system in accordance with aspects of the present disclosure. The application development interface 400 may include a component 410 that corresponds to a selected component from a listing of available components. Upon selection of a component 410, properties 415 associated with the selected component as well as information associated with the component 410 may be displayed within the application development interface 400. In embodiments, properties 415 associated with the selected component may include one or more selectable icons 420 that may correspond to configurations for the component 410.

Referring to FIG. 4A, the selected component 410 is a Message Broker component. The application development interface 400 includes information associated with the message broker component. In embodiments, the information may include a description of the functionality of the selected component to enable a user to understand the function of a component without having intricate knowledge of the various components of an application. For example, the information for the Message Broker may indicate that a message broker translates messages. The properties 415 for the message broker enable the selection of the type of message broker that will be used for the application. In FIG. 4A, the selectable icon 420 corresponding to the Queue type of message broker is selected. Accordingly, when generating the application, the application server may configure the message broker component as a Queue type of message broker.

In embodiments, application development interface 400 may be provided to a client device for presentation by the client device. The selection of the selectable icon 420 may be made by the client device. For example, a user of the client device may select one of selectable icons 420 in the application development interface 400. The client device may then transmit the selection to the application server.

Figure 4B:
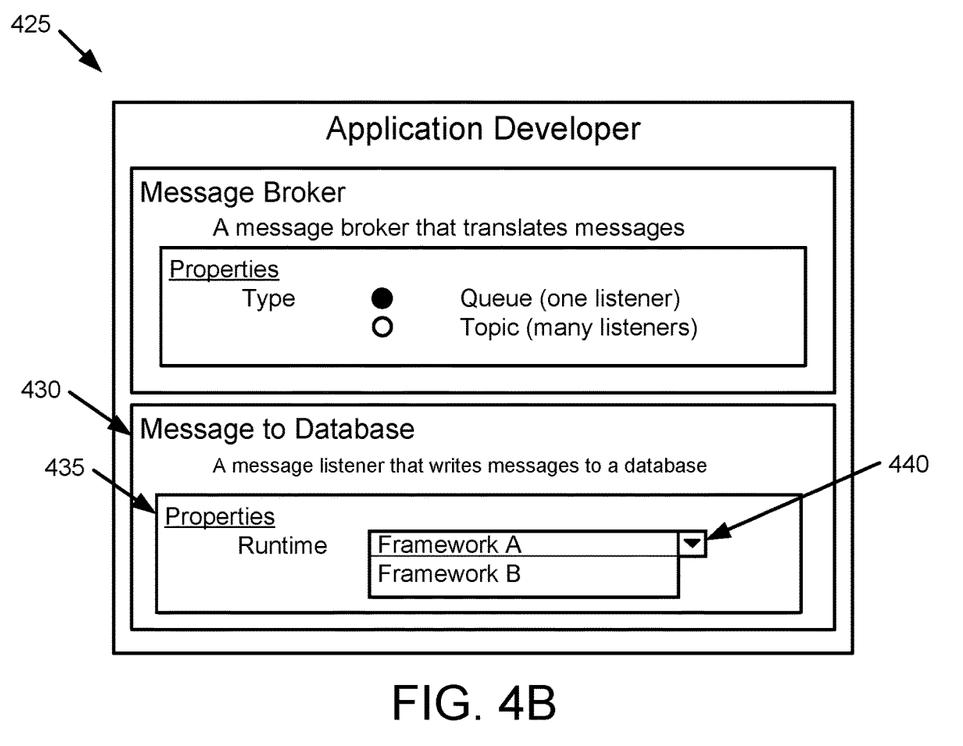
FIG. 4B is an illustration of an example of an application development interface including a second component of an application development system in accordance with aspects of the present disclosure.

FIG. 4B is an illustration of an example of an application development interface 425 including a second component of an application development system in accordance with aspects of the present disclosure. The application development interface 425 may include a component 430, properties 435 associated with the component and selectable icon 440, as previously described at FIG. 4A.

Referring to FIG. 4B, the selected component 430 is a message to database that may write messages translated by the message broker to a database. In embodiments, the selected component 430 may be identified and recommended by the application server in response to receiving the selected component 410 of FIG. 4A. For example, upon receiving the selection of the message broker component, the application server may identify a message to database component and recommend that the message to database component be added to the application. In some embodiments, the application server may recommend the selected component 430 via the application development interface.

In FIG. 4B, the properties 435 for the message to database component 430 include runtime information. For example, the properties 435 may include a listing of application frameworks that may be used to configure the message to database component. The application server may configure the message to database component in view of the selected application framework when generating the application. In some embodiments, the application development interface 425 may be presented by a client device and selections of configurations made via the application development interface 425 may be transmitted by the client device to the application server, as previously described.

Figure 4C:
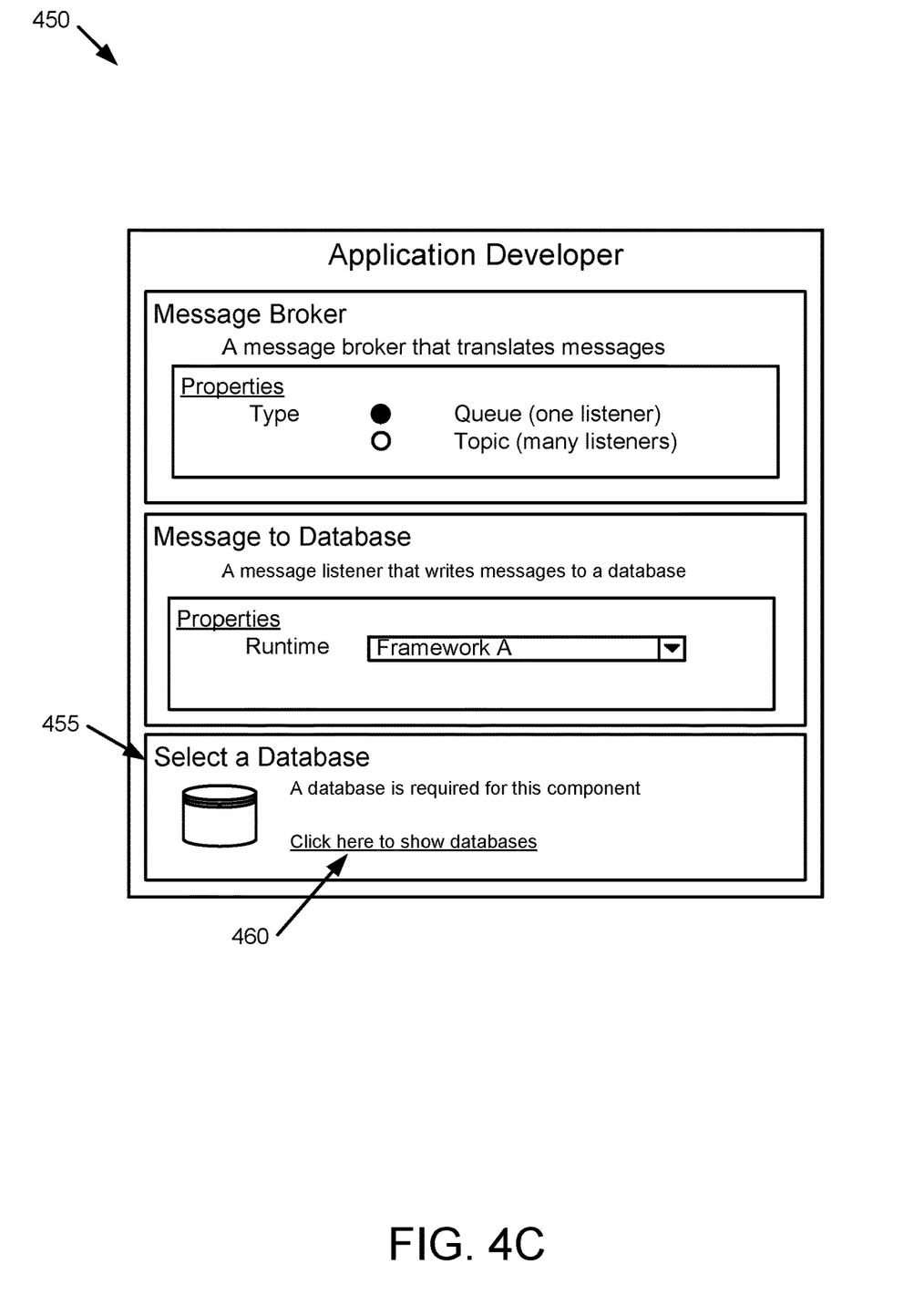
FIG. 4C is an illustration of an example of an application development interface including a dependent component of an application development system in accordance with aspects of the present disclosure.

FIG. 4C is an illustration of an example of an application development interface 450 including a dependent component of an application development system in accordance with aspects of the present disclosure. The application development interface 450 may include a component 455 and selectable icon 460, as previously described at FIG. 4B. In embodiments, component 455 may be a dependent component that is used by a previously selected component. For example, the previously selected message to database component writes messages to a database. Accordingly, a database for the messages to be written to by the message to database component may be a dependent component.

Referring to FIG. 4C, component 455 indicates that a database is required for the message to database component. Component 455 includes a selectable icon 460 that, when selected, provides a listing of available databases to be utilized by the message to database component.

Figure 4D:
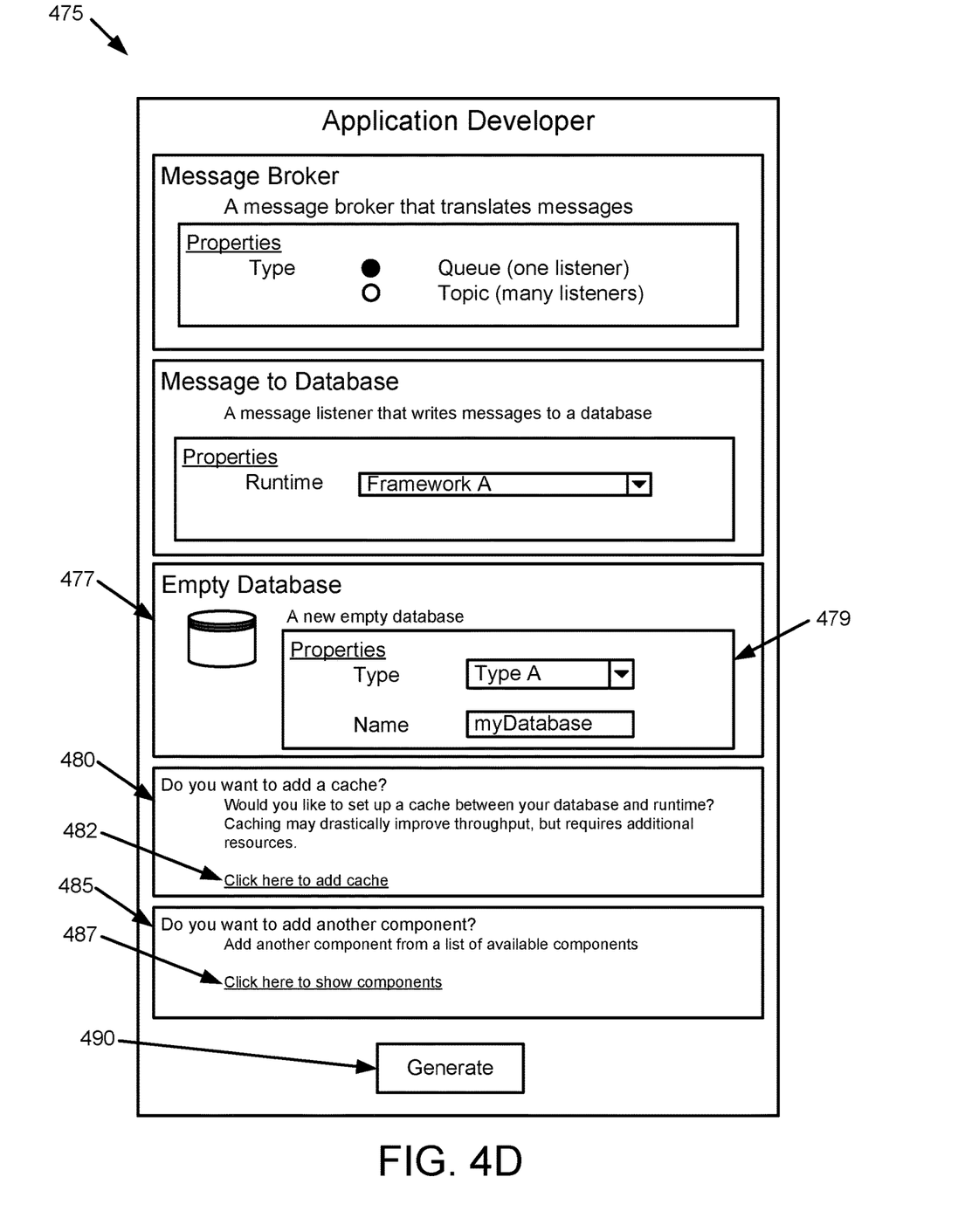
FIG. 4D is an illustration of an example of an application development interface including a supporting component of an application development system in accordance with aspects of the present disclosure.

FIG. 4D is an illustration of an example of an application development interface 475 including a supporting component of an application development system in accordance with aspects of the present disclosure. The application development interface 475 may include a component 477 and properties 479, as previously described. In embodiments, component 477 may correspond to a database selected from the listing of databases, as previously described at FIG. 4C.

Referring to FIG. 4D, component 477 corresponds to an empty database for the storage of messages. Properties 479 for the component 477 correspond to the type of database and name of the database that may be used to configure the database when the application server generates the application. In embodiments, other properties 479 associated with the component 477 may be provided. For example, login credentials to access component 477 may be provided as properties 479.

The application development interface 475 may further include a supporting component 480. The application server may identify supporting components 480 in view of previously selected components of the application. For example, in FIG. 4D, the application server may identify a cache as a supporting component 480 in view of the previously selected message to database component and database component. The supporting component 480 may include a selectable icon 482 that may be selected to add a cache to the application.

The application development interface 475 may further include an additional component option 485. The additional component option 485 may correspond to additional components that may be added to the application. The additional component option 485 may include a selectable icon 487. In embodiments, the selection of selectable icon 487 may cause a listing of available components that may be added to the application to be provided by the application server.

In embodiments, the application development interface 475 may include a generation icon 490 that may be selected. Upon selection of the generation icon, the application server may generate the application in view of the selected components and configurations as previously described at FIGS. 4A-D. In an embodiment, after the application server has generated the application, the application server may deploy the application for distribution. In embodiments, the application server may deploy the application on a cloud-based platform. In some embodiments, the application development interface 475 may be presented by a client device and selections of configurations made via the application development interface 475 may be transmitted by the client device to the application server, as previously described.

It should be noted that FIGS. 4A-D are shown for illustrative purposes. Although illustrated as a single user interface, embodiments of the disclosure may utilize any number of user interfaces to display components for utilization by an application. Furthermore, any number and/or combination of properties for each of the components may be included in the application development interface.

Figure 5:
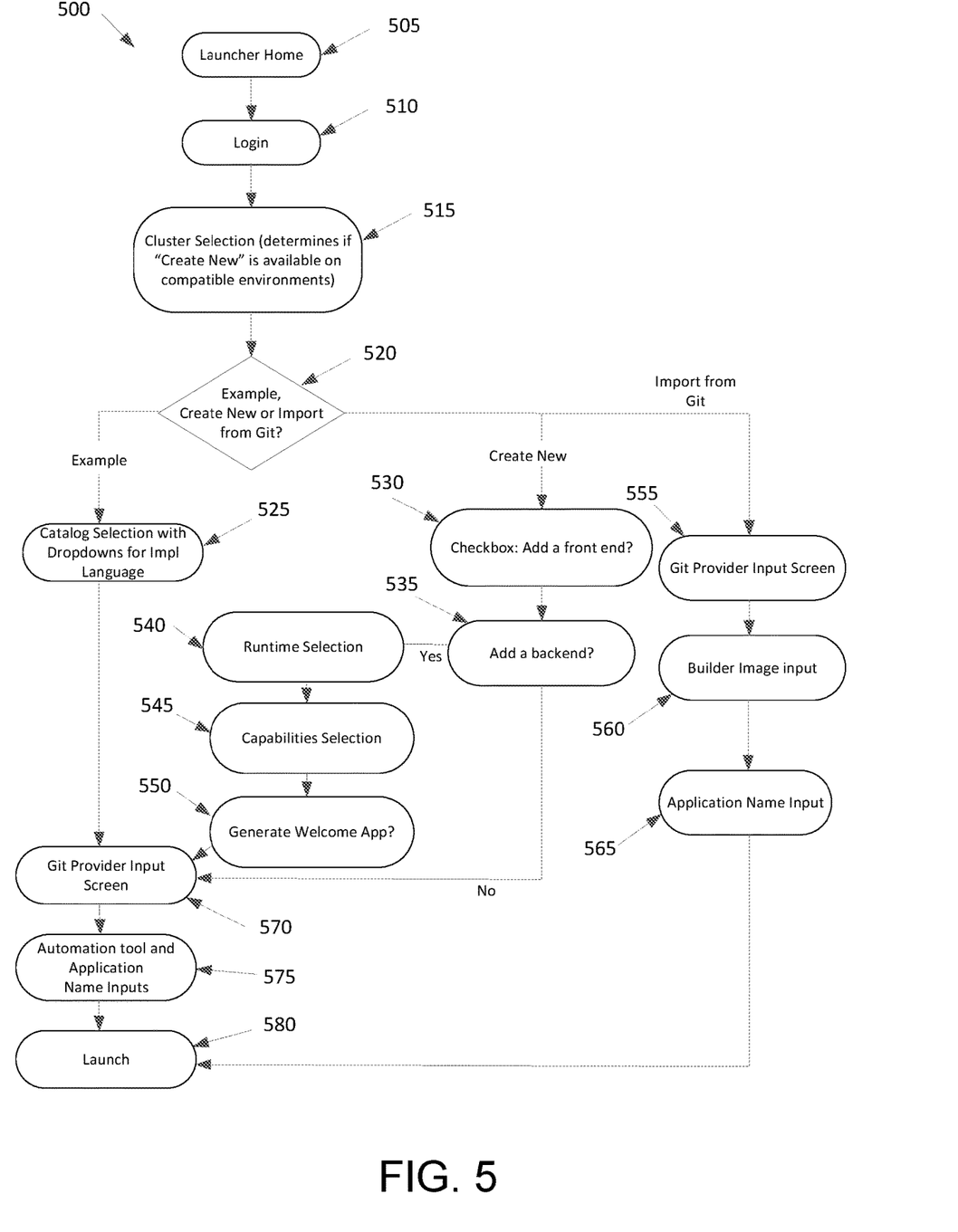
FIG. 5 is a flow diagram of a method of generating an application using an application development platform, in accordance with some embodiments of the present disclosure.

FIG. 5 is a flow diagram of a method 500 of generating an application using an application development platform, in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 500 may be performed by application development component 129 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring to FIG. 5, at block 505 the processing logic causes the display of a launcher home screen for the application development platform. In some embodiments, the launcher home screen may include one or more fields for the entering of login credentials associated with a user of the application development platform.

At block 510, the processing logic receives a login request from a user of the application development platform. Upon receiving the login request, at block 515 the processing logic may provide a cluster selection user interface. In embodiments, the processing logic may determine if an option to create a new application is available to the user in view of the environment being utilized by the user. For example, if the user is using a compatible environment, then the user may be given the option to create a new application. Otherwise, the user may be limited to selecting an example application from a catalog or importing the application from Git, as will be described in further detail below. The processing logic may receive a selection of a cluster via the cluster selection user interface.

At block 520, the processing logic determines if the selection of the cluster from the cluster selection user interface corresponds to an example application, a new application or importing from Git. If the selection corresponds to an example application, at block 525 the processing logic provides a user interface including a catalog of example applications to the client device. In embodiments, the user interface may include one or more dropdowns for the programming language implementation to be utilized by the application. The processing logic may receive a selection from the client device of an example application and a programming language implementation to be used for the application via the user interface. Upon receipt of the selection, method 500 may proceed to block 570, which is described in more detail below.

If the selection corresponds to creating a new application, at block 530 the processing logic provides a new application user interface. In embodiments, the new application user interface includes an option to add a frontend to the new application. For example, the user interface may include a check box that may be selected by the client device if a frontend is desired for the application. If the client device indicates that a frontend is desired for the application, a dropdown menu may be provided that includes one or more programming language libraries to be utilized for the frontend of the application. The client device may then select a programming language library from the dropdown menu. For example, the client device may select React from a dropdown menu to be utilized for the frontend of the application.

At block 535, the processing logic provides an option to add a backend to the new application via the new application user interface. For example, the user interface may include a check box that may be selected by the client device if a backend is desired for the application. If the client device indicates that a backend is desired for the application, at block 540 a menu may be provided that includes one or more runtimes to be utilized for the backend of the application. In some embodiments, the menu may also include a dropdown menu for the selection of different versions of each of the one or more runtimes.

At block 545, the procession logic provides one or more capabilities that may be utilized by the backend of the application, as previously described at FIGS. 4A-D. At block 550, the processing logic provides an option to generate a welcome application via the new application user interface.

At block 570, the processing logic provides a Git provider user interface for display by the client device. The user interface may include one or more Git providers that may be utilized for the development of the application. The processing logic may receive a selection from the client device of a Git provider from the one or more Git providers via the user interface. At block 575, the information received from the selections by the client device via the user interface(s) is provided as inputs to a build automation tool. The build automation tool may proceed to generate the application in view of the inputs. In embodiments, the processing logic may provide one or more input fields for the input of names for the capabilities of the application and/or the application. At block 580, upon generation of the application, the processing logic may launch the application. For example, the processing logic may deploy the application on a cloud-based platform.

If the processing logic determines that the cluster selection at block 515 corresponds to importing from Git, at block 555 the processing logic provides a Git provider user interface for display by the client device. The client device may provide, via the user interface, the Git provider to the processing logic. At block 560, the processing logic provides a builder image user interface for display by the client device. The builder image user interface may include one or more disk image builders that may be selected by a client device for use in generating the application. Upon receiving a selection of a builder image, at block 565, the processing logic provides one or more input fields for the input of names for the application components and/or the application and generates the application in view of the Git provider, selected builder image and naming inputs. At block 580, the processing logic launches the application.

Figure 6:
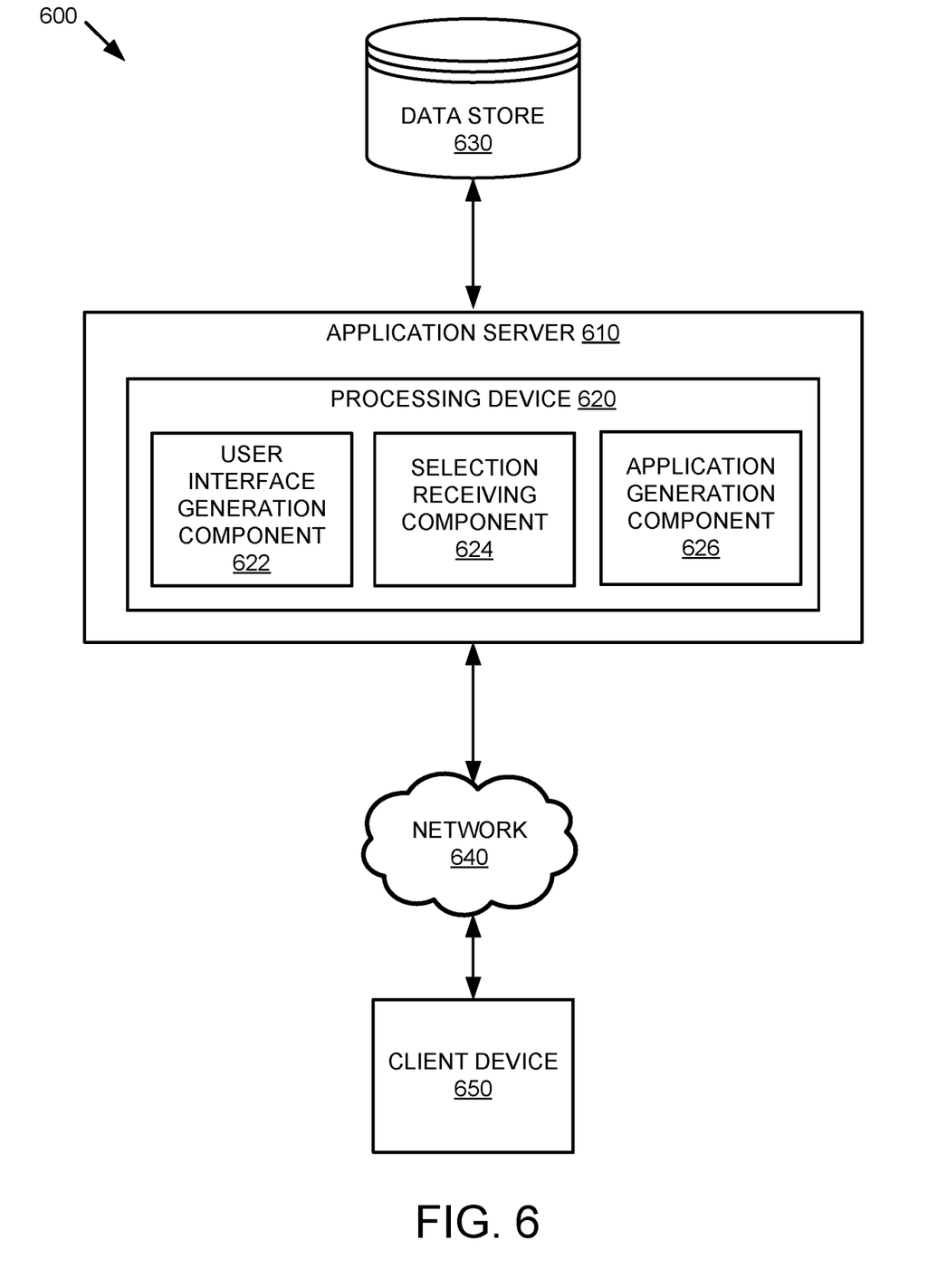
FIG. 6 is a block diagram that illustrates an example of an application server in accordance with some aspects of the present disclosure.

FIG. 6 is a block diagram 600 that illustrates an example of an application server in accordance with some aspects of the present disclosure. A processing device 620 of the application server 610 is coupled to a data store 630. The processing device 620 may include a user interface generation component 622, a selection receiving component 624, and an application generation component 626. The application server 610 may be operatively coupled to a client device 650 via a network 640.

The user interface generation component 622 may generate an initial user interface. The user interface generation component 622 may further generate an application development interface. The user interface generation component 622 may also cause the display of the user interface and/or application development interface. The selection receiving component 624 may receive selections of components via the application development interface. The application generation component 626 may generate an application in view of the received components selected via the application development interface.

Figure 7:
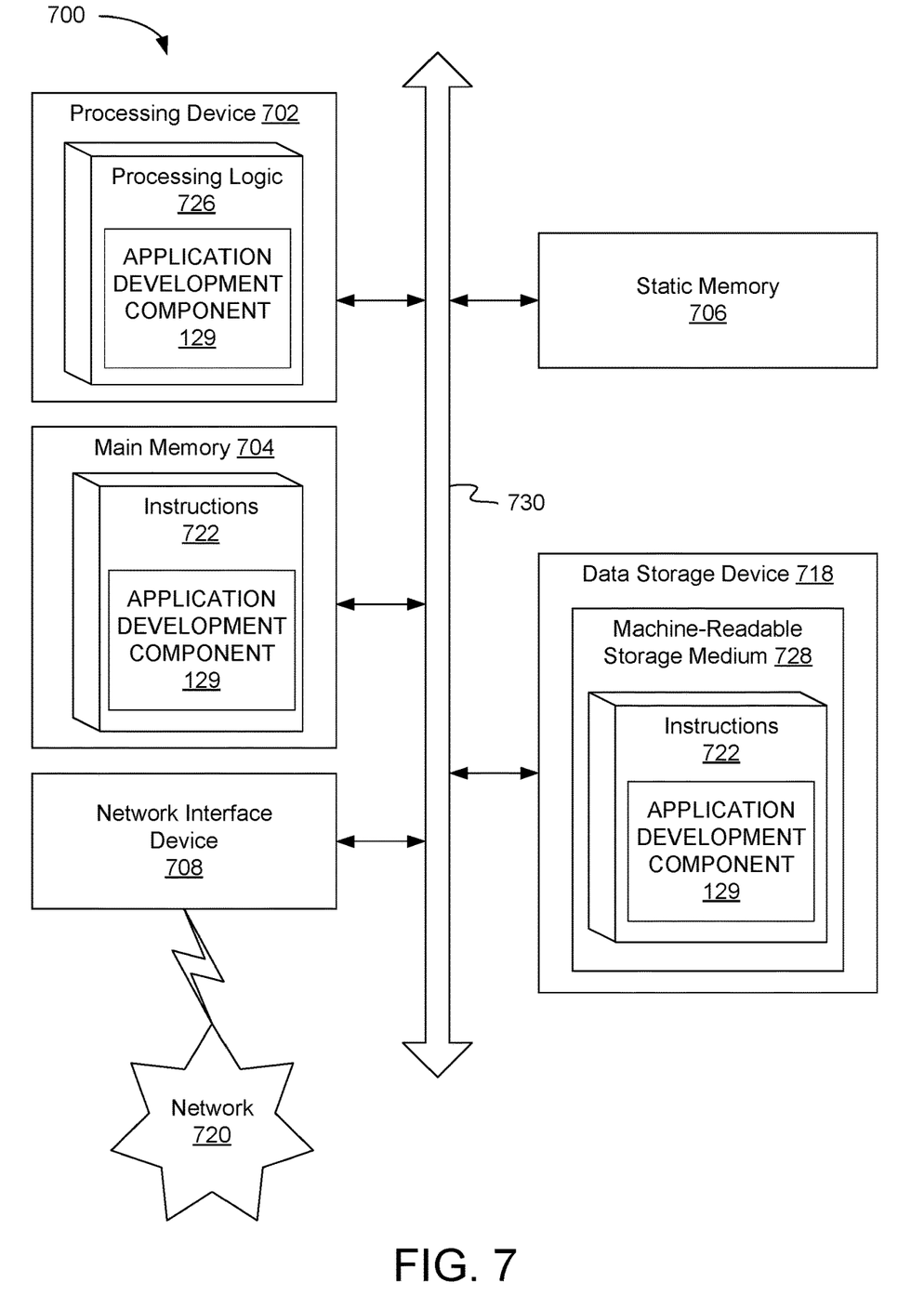
FIG. 7 is a block diagram of an example apparatus that may perform one or more of the operations described herein, in accordance with some embodiments.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as application server 110 configured to perform application development.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of application development component 129 of FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute application development component 129. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for multi-level task debugging, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
causing display of a user interface comprising a plurality of components associated with an application to be generated by an application server;
receiving, via the user interface, a first selection of a component from the plurality of components associated with the application, wherein the first selected component comprises a message broker component;
in response to receiving the first selection of the component, identifying a plurality of properties associated with the first selected component, wherein the plurality of properties comprises a selectable queue type of the message broker component selected;
receiving, via the user interface, a second selection of a component from the plurality of components associated with the application, wherein the second selected component comprises a message to database component;
receiving, via the user interface, a dependent component that is used by at least one of the previously selected component, wherein the dependent component comprises a database component for the messages;
receiving, via the user interlace, a supporting component in view of the second selected component being the message to database component and the dependent component being the database component, wherein, the supporting component comprises a hardware component; and
generating the application in view of the first selected component and one or more properties of the plurality of properties associated with the first selected component.

2. The method of claim 1, wherein the method further comprises:
deploying the generated application on a cloud-based platform.

3. The method of claim 1, wherein generating the application in view of the first selected component and the one or more properties associated with the first selected component comprises:
providing the first selected component and the one or more properties of the plurality of properties associated with the first selected component to a build automation tool, wherein the first selected component and the one or more properties of the plurality of properties associated with the first selected component are utilized as inputs by the build automation tool.

4. The method of claim 1, further comprising:
providing the user interface to a client device, wherein receiving the first selection of a component from the plurality of components is in response to providing the user interface to the client device.

5. The method of claim 1, wherein generating the application in view of the first selection of a component and the one or more properties of the plurality of properties associated with the first selected component comprises:
configuring the message broker component.

6. The method of claim 1, comprising:
in response to receiving the second selection of a component, identifying: a plurality of properties associated with the second selected component.

7. The method of claim 6, wherein the plurality of properties associated with the second selected component comprises at least a runtime information.

8. A system, comprising:
a memory; and
a processing device, operatively coupled to the memory, to:
present a user interface comprising a plurality of components associated with an application to be generated by an application server;
receive, via the user interface, a first selection of a component from the plurality of components associated with the application, wherein the first selected component comprises a message broker component;
present, in the user interface:
a plurality of properties associated with the first selected component, wherein the plurality of properties comprises a selectable queue type of the message broker component selected;
receive, via the user interface, a second selection of a component from the plurality of components associated with the application, wherein the second selected component comprises a message to database component;
receive, via the user interface, a dependent component that is used by at least one of the previously selected component, wherein the dependent component comprises a database component for the messages;
receive, via the user interface, a supporting component in view of the second selected component being the message to database component and the dependent component being the database component, wherein, the supporting component comprises a hardware component; and
generate the application in view of the first selected component and one or more properties of the plurality of properties associated with the first selected component.

9. The system of claim 8, wherein the processing device is further to:
receive, from the application server, the user interface comprising the plurality of components associated with the application, wherein presenting the user interface comprising the plurality of components is in response to receiving the user interface from the application server.

10. The system of claim 8, wherein the processing device is further to:
in response to receiving the first selection of a component from the plurality of components, transmit the selected component to the application server; and
receive, from the application server, the plurality of properties associated with the first selected component, wherein the processing device is to present the plurality of properties in response to receiving the plurality of properties from the application server.

11. The system of claim 8 comprising a processing device, operatively coupled to the memory, to further present:
a plurality of properties associated with the second selected component.

12. The system of claim 11, wherein the plurality of properties associated with the second selected component comprises at least a runtime information.

13. The system of claim 8, wherein the hardware component comprises a cache.

14. A non-transitory computer-readable storage medium including instructions that, when executed by a processing device of an application server, cause the processing device to:

cause display of a user interface comprising a plurality of components associated with an application to be generated by the application server;

receive, via the user interface, a first selection of a component from the plurality of components associated with the application, wherein the first selected component comprises a message broker component;

in response to receiving the first selection of the component, identify a plurality of properties associated with the first selected component, wherein the plurality of properties comprises a selectable queue type of the message broker component selected;

receive, via the user interface, a second selection of a component from the plurality of components associated with the application, wherein the second selected component comprises a message to database component;

receive, via the user interface, a dependent component that is used by at least one of the previously selected component, wherein the dependent component comprises a database component for the messages;

receive, via the user interface, a supporting component in view of the second selected component being the message to database component and the dependent component being the database component, wherein, the supporting component comprises a hardware component; and generating the application in view of the first selected component and one or more properties of the plurality of properties associated with the first selected component.

15. The non-transitory computer-readable storage medium of claim 14, wherein the processing device is further to:

deploy the generated application on a cloud-based platform.

16. The non-transitory computer-readable storage medium of claim 14, wherein to generate the application in view of the first selected component and the one or more properties associated with the First selected component, the processing device is further to:

provide the first selected component and the one or more properties of the plurality of properties associated with the first selected component to a build automation tool, wherein the First selected component and the one or more properties of the plurality of properties associated with the first selected component are utilized as inputs by the build automation tool.

17. The non-transitory computer-readable storage medium of claim 14, wherein the processing device is further to:

provide the user interface to a client device, wherein receiving the first selection of the component from the plurality of components is in response to providing the user interface to the client device.

18. The non-transitory computer-readable storage medium of claim 14, wherein to generate the application in view of the first selected component and the one or more properties of the plurality of properties associated with the first selected component, the processing device is further to:

configure the message broker component.

19. The non-transitory computer-readable storage medium of claim 14, wherein the hardware component comprises a cache.

20. The non-transitory computer-readable storage medium of claim 14, wherein the processing device is further to:

in response to receiving the second selection of the component, identify:

a plurality of properties associated with the second selected component.

* * * * *